United States Patent
Bigot et al.

(10) Patent No.: US 9,921,369 B2
(45) Date of Patent: Mar. 20, 2018

(54) MULTIMODE OPTICAL FIBER WITH HIGH BANDWIDTH, AND CORRESPONDING MULTIMODE OPTICAL SYSTEM

(71) Applicant: Draka Comteq B.V., Amsterdam (NL)

(72) Inventors: Marianne Bigot, Paron (FR); Denis Molin, Paron (FR); Pierre Sillard, Paron (FR)

(73) Assignee: Draka Comteq, B.V., Amsterdam (NL)

( * ) Notice: Subject to any disclaimer, the term of this patent is extended or adjusted under 35 U.S.C. 154(b) by 0 days.

(21) Appl. No.: 15/510,296

(22) PCT Filed: Sep. 12, 2014

(86) PCT No.: PCT/IB2014/002336
§ 371 (c)(1),
(2) Date: Mar. 10, 2017

(87) PCT Pub. No.: WO2016/038414
PCT Pub. Date: Mar. 17, 2016

(65) Prior Publication Data
US 2017/0248755 A1    Aug. 31, 2017

(51) Int. Cl.
*G02B 6/028* (2006.01)
*G02B 6/036* (2006.01)
(52) U.S. Cl.
CPC ....... *G02B 6/0288* (2013.01); *G02B 6/03627* (2013.01); *G02B 6/0281* (2013.01)
(58) Field of Classification Search
CPC . G02B 6/0288; G02B 6/03627; G02B 6/0281
(Continued)

(56) References Cited

U.S. PATENT DOCUMENTS 7,315,677 B1    1/2008 Li et al.
7,903,918 B1    3/2011 Bickham et al.
(Continued)

FOREIGN PATENT DOCUMENTS

EP    1503230 A1    2/2005
EP    2482106 A1    8/2012
(Continued)

OTHER PUBLICATIONS

International Search Report in counterpart International Application No. PCT/IB2014/002336 dated May 18, 2015, pp. 1-2.
(Continued)

*Primary Examiner* — Jerry Blevins
(74) *Attorney, Agent, or Firm* — Additon, Higgins & Pendleton, P.A.

(57) ABSTRACT

The invention concerns a multimode optical fiber, with an α-profile graded-index core with an a-value between 1.96 and 2.05 and a N value defined as $N=(R_1/\lambda)^2(n_1^2-n_0^2)$ between 7 and 52, where $R_1$ is the multimode core radius, $n_1$ is the maximum index of the multimode core and $n_0$ is the minimum index at the outer edge of the graded index core. According to the invention, a depressed region directly surrounds the graded/index core and satisfies the criteria: $-2.20<Dn_2<0$, where $Dn_2$ is the index difference of depressed region with external cladding, and $220\,Ln(N)-1100<V_2<220\,Ln(N)-865$, where $V_2$ is the volume of the depressed region. Such a multimode fiber shows an increased OFL-bandwidth above 10000 Hz·km at an operating wavelength between 950 nm and 1310 nm.

17 Claims, 2 Drawing Sheets

(58) Field of Classification Search
USPC .......................................................... 385/124
See application file for complete search history.

(56) References Cited

U.S. PATENT DOCUMENTS

| | | | |
|---|---|---|---|
| 8,391,661 B2 | 3/2013 | Molin et al. | |
| 2010/0303428 A1 | 12/2010 | Bickham et al. | |
| 2012/0051084 A1* | 3/2012 | Yalin .................... | G02B 6/028 362/553 |
| 2012/0328255 A1 | 12/2012 | Bickham | |
| 2013/0004135 A1 | 1/2013 | Bigot-Astruc et al. | |
| 2013/0039626 A1 | 2/2013 | Bickham et al. | |
| 2013/0077926 A1 | 3/2013 | Bickham et al. | |
| 2013/0136405 A1* | 5/2013 | Bookbinder ........... | G02B 6/028 385/124 |

FOREIGN PATENT DOCUMENTS

| | | |
|---|---|---|
| EP | 2541292 A1 | 1/2013 |
| WO | 2016/038414 A1 | 3/2016 |

OTHER PUBLICATIONS

International Preliminary Report on Patentability in counterpart International Application No. PCT/IB2014/002336 dated Mar. 14, 2017, pp. 1-8.

* cited by examiner

MULTIMODE OPTICAL FIBER WITH HIGH BANDWIDTH, AND CORRESPONDING MULTIMODE OPTICAL SYSTEM

1. FIELD OF THE INVENTION

The present invention relates to the field of optical fiber transmissions, and more specifically, to multimode fibers used in relative long reach and high bitrate systems. More specifically, the invention relates to multimode optical fibers designed to fulfill the high bit rate requirements of next generation 400 GbE systems.

2. BACKGROUND

Multimode fibers are successfully used in high-speed data networks together with high-speed sources that are typically using transversally multimode vertical cavity surface emitting lasers, more simply called VCSELs. Multimode fibers operating at 850 nm and 1300 nm are well known.

Multimode fibers are affected by intermodal dispersion, which results from the fact that, in a multimode fiber, for a particular wavelength, several optical modes propagate simultaneously along the fiber, carrying the same information, but travelling with different propagation velocities. Modal dispersion is expressed in terms of Differential Mode Delay (DMD), which is a measure of the difference in pulse delay (ps/m) between the fastest and slowest modes traversing the fiber.

Typically, an optical fiber should have the broadest bandwidth, for it to be used in high bandwidth applications. For a given wavelength, the bandwidth may be characterized in several different ways. Typically, a distinction is made between the so-called overfilled launch condition (OFL) bandwidth and the so-called effective modal bandwidth condition (EMB). The acquisition of the OFL bandwidth attunes the use of a light source exhibiting uniform excitation over the entire radial surface of the optical fiber (using a laser diode or a Light Emitting Diode (LED)). The calculated effective modal bandwidth (EMBc) derived from the DMD measurement has been developed to estimate the minimum Effective Modal Bandwidth of the 50 µm core diameter fiber under inhomogeneous excitation over its radial surface, as it is when using a Vertical Cavity Surface Emitting Laser (VCSEL) source operating at 850 nm.

Embodiments of the method measuring DMD and calculating the effective modal bandwidth can be found in the FOTP 220 standard, while bandwidth measured over overfilled launch condition is described in IEC 66793-1-41 (TIA-FOTP-204).

In order to minimize modal dispersion, the multimode optical fibers used in data communications generally comprise a core, generally doped with Germanium, and showing a refractive index that decreases progressively going from the center of the fiber to its junction with a cladding. In general, the index profile is given by a relationship known as the "α profile", as follows:

$$n(r) = n_1 \sqrt{1 - 2\Delta\left(\frac{r}{a}\right)^\alpha} \text{ for } r \le a,$$

where:
$n_1$ is a refractive index on an optical axis of a fiber;
r is a distance from said optical axis;
a is a radius of the core of said fiber;
$\Delta$ is a non-dimensional parameter, indicative of an index difference between the core and a cladding of the fiber; and
α is a non-dimensional parameter, indicative of a shape of the index profile.

When a light signal propagates in such a core having a graded index, the different modes experience a different propagation medium, which affects their speed of propagation differently. By adjusting the value of the parameter α, it is thus possible to theoretically obtain a group velocity, which is virtually equal for all the modes and thus a reduced intermodal dispersion for a particular wavelength.

In practice, however, multimode fibers are manufactured with a graded index central core surrounded by an outer cladding of constant refractive index. Thus, the core of the multimode fiber never corresponds to a theoretically perfect alpha profile, because the interface of the core (having an alpha profile) with the outer cladding (having a constant refractive index) interrupts the alpha profile. The outer cladding accelerates the higher order modes compared to the lower order modes and some differences of time delay appear within the highest order mode groups. This phenomenon is known as the cladding effect. In DMD measurement the responses acquired for the highest radial positions (i.e. nearest the outer cladding) exhibit multiple pulses, which results in a temporal spreading of the response signal. Therefore bandwidth is diminished by this cladding effect.

Graded-index alpha-shape profile and core-cladding interface of the multimode fibers are optimized to operate with GaAs VCSELs that can be directly current-modulated to support 10 Gbps and 25 Gbps systems at 850 nm. Backwards compatibility for use at 1300 nm with LED sources is also guaranteed for most of the 50 µm and 62.5 µm multimode fibers currently in use. The performances of such laser-optimized, high bandwidth 50 µm multimode fibers, also called OM4 fibers, have been standardized by the International Standardization Organization in document ISO/IEC 11801, as well as in TIA/EIA 492AAAD standard.

However, the explosion in demand for bandwidth in enterprise networks is driving an urgent need for higher Ethernet network speeds. To further increase the data bit rate for next generation 400 GbE systems, the use of InGaAs VCSELs operating at 40-56 Gb/s between around 1060 nm appears as a promising solution, as it will allow achieving higher speed with higher reliability, lower operating temperature and lower cost of the VCSELs. Furthermore, at this wavelength, the fiber exhibits lower attenuation, lower chromatic dispersion and higher potential modal bandwidth because of fewer modal groups if the graded-index alpha-shape profile is optimized to operate at this specific wavelength.

While such VCSELs can be proposed now for high-speed applications, fibers optimized for these VCSELs operating at wavelength greater than 950 nm are missing.

Actually, the one skilled in the art knows well that the inter-modal dispersion can be reduced by adapting the alpha-shape profile and the core-cladding interface to the operating wavelength.

The alpha value can be easily assessed by testing different alpha-shape profiles, the optimum alpha varying monotonically with wavelength for a given composition, whatever the core radius and the core index. However, defining the optimum geometry for the core-cladding interface is more delicate since there is no simple relationship between wavelength and the geometry of core-cladding interface whatever the core radius and core index.

At wavelengths longer than 850 nm, because of fewer modal groups, the proportion of modal groups directly affected by the core-cladding geometry is larger. Thus, its optimization is more delicate and its impact on the total bandwidth is increased. In the same manner, with small core radius, because of fewer modal groups, impact of core-cladding geometry on the total bandwidth is increased too.

Many studies have been carried out so far, in order to design multimode fibers, which bandwidth would be sufficiently high over a relatively large wavelength range.

Document EP 1 503 230, in the name of DRAKA Comteq BV, discloses a multimode optical fiber having a refractive index profile, comprising a light-guiding core surrounded by one or more cladding layers. According to this document, the multimode optical fibers can be obtained by using two or more dopants for building up the gradient index core, notably by using co-doping with fluorine F and germanium $GeO_2$. By varying the concentration of dopants over the core radius, the intermodal dispersion characteristics of the multimode optical fiber can be adapted in such a manner that the bandwidth is less wavelength-dependent.

A drawback of this technique is that the bandwidths achieved with such multimode fibers and reported in this prior art document are not large enough.

Document EP 2 482 106, also in the name of DRAKA Comteq BV, discloses a multimode optical fiber, which includes a central core having a graded-index profile with a delta value of about 1.9 percent or greater. The graded-index core profile has at least two different alpha parameter values along the core radius, namely a first value in an inner zone of the central core and a second value in an outer zone of the central core. The second alpha parameter value is typically less than the first alpha parameter value. The graded-index core profile and its first derivative are typically substantially continuous over the width of the graded-index core.

Fibers disclosed in this prior art document show high numerical aperture NA with bandwidths optimized for a single wavelength at 850 nm. Moreover, the high NA value requires a graded-index core with two or more a-values.

Document U.S. Pat. No. 7,315,677 discloses multimode optical fibers comprising Germania (GeO2) and Fluorine co-doped in the core of the fiber. The dopant concentration profiles are defined by a pair of alpha parameters, $\alpha_1$ and $\alpha_2$. The operating window, or bandwidth window, is enlarged and attenuation, or loss, is low. In some embodiments, two operating windows are available for transmission.

Document U.S. Pat. No. 7,315,677 hence teaches "double alpha profiles" based on co-doping, with fluorine F and germanium $GeO_2$; each dopant profile exhibits its own alpha. Such profiles are difficult to produce from a process point of view. Actually, the concentration shape of Ge and F are difficult to control.

Document U.S. Pat. No. 7,903,918 discloses bend resistant optical fibers, which are multi-moded at 1300 nm and include a core, an inner cladding, a low index ring and an outer cladding. The core has a graded index of refraction with a core alpha profile where $1.9 \leq \alpha \leq 2.1$, a maximum relative refractive index percent $\Delta_{1Max}\%$, and a numerical aperture NA greater than 0.23. The inner cladding surrounds the core and has a maximum relative refractive index percent $\Delta_{2Max}\%$, a minimum relative refractive index percent $\Delta_{2min}\%$, and a radial thickness microns, wherein $\Delta_{1Max}\% > \Delta_{2Max}\%$. The low index ring surrounds the inner cladding and has a relative refractive index percent $\Delta_3\%$, a radial thickness of at least 0.5 microns, a profile volume with an absolute magnitude of greater than 50%-$\mu m^2$, wherein $\Delta_{2Min}\% \geq \Delta_3\%$. The outer cladding surrounds the low index ring and has a relative refractive index percent $\Delta_4\%$, such that $\Delta_{1Max}\% > \Delta_4\% \geq \Delta_{2Max}\%$.

Fibers disclosed in this document show high NA values, deep trenches and high trench volumes. They are optimized to operate at 1300 nm.

Document US 2010/0303428 discloses bend resistant multimode optical fibers, which comprise a core region and a cladding region surrounding and directly adjacent to the core region, the cladding region comprising a depressed-index annular region; the inner boundary of the depressed index region is an extension of the graded index core, the depressed region having a moat volume greater than 105%-µm2. Such fibers hence show deep trenches and high trench volumes.

Document US2013/0077926 discloses several embodiments of multimode fibers, in which trenches are added for bend-loss improvement. According to some embodiments, a multimode optical fiber comprises a graded-index glass core with refractive index $\Delta_1$, a maximum refractive index delta $\Delta_{1MAX}$, and a core radius between 10 and 40 microns; and cladding region surrounding the core comprising refractive index $\Delta_4$, wherein the fiber exhibits an overfilled bandwidth at an operating wavelength in a 900 to 1250 nm wavelength range of greater than 2.5 GHz·km. According to some embodiments, the fiber exhibits an overfilled bandwidth at a wavelength between 950 and 1100 nm, which is greater than 4 GHz·km. According to some embodiments the fiber exhibits an overfilled bandwidth at a wavelength between 950 and 1100 nm, which is greater than 10 GHz·km. The volumes of the trenches disclosed in this document are very large. Moreover, the profiles disclosed are quite complex to design.

Document US2013/0039626 also discloses multimode fibers in which a trench is added in the cladding, in order to improve the bending performances of the multimode fiber. The disclosed multimode optical fiber includes a graded index glass core having a diameter in the range of 24 microns to 40 microns, a graded index having an alpha profile less than 2.12 and a maximum relative refractive index in the range between 0.6% and 1.9%. The fiber also includes a cladding surrounding and in contact with the core. The cladding includes a depressed-index annular portion. The fiber further has an overfilled bandwidth greater than 2.0 GHz-km at 1310 nm.

The volumes of the trenches disclosed in this document are very large. Trench is added to improve the bending performances of small core diameter MMFs.

In view of the foregoing, it would be desirable to design a multimode optical fibre adapted to high-speed applications (next generation 400 GbE systems with VCSEL transmitting at 25 Gb/s or higher) and showing improvements over the prior art.

More precisely, it would be desirable to design such a multimode optical fiber, showing an OFL-bandwidth above 10000 MHz·km at an operating wavelength between 950 nm and 1310 nm.

It would also be desirable to design multimode optical fibers with optimized core-cladding geometry according to the number of mode groups supported by the MMF at the operating wavelength.

3. SUMMARY

In one particular embodiment of the invention, a multi-mode optical fiber is proposed, comprising a central core surrounded by an outer optical cladding, said central core having (i) an outer radius $R_1$, (ii) a maximum refractive index $n_1$, (iii) a minimum refractive index $n_0$, and (iv) a graded-index profile n(r) that is a function of the radial distance r from the center of said central core. The central core's graded-index profile n(r) is defined by the following equation:

$$n(r) = n_1 \sqrt{1 - 2\Delta\left(\frac{r}{R_1}\right)^\alpha}$$

where:

$$\Delta = \frac{(n_1^2 - n_0^2)}{2n_1^2}$$

and $\alpha$ is between 1.96 and 2.05, with $\alpha$ a non-dimensional parameter that is indicative of the shape of the index profile,
with $n_0$ and $n_1$ at an operating wavelength $\lambda$,
said central core has a N value between 7 and 52, where N is defined by the following equation:

$$N = \left(\frac{R_1}{\lambda}\right)^2 (n_1^2 - n_0^2),$$

with $\lambda$ the operating wavelength such that $\lambda \geq 950$ nm.

Moreover, said optical cladding comprises a region of depressed refractive index $n_2$, called a trench, surrounding the optical core, said trench having an inner radius $R_1$, an outer radius $R_2$, with $R_2 > R_1$, a refractive index difference $Dn_2 = (n_2 - n_{Cl}) \times 1000$ with respect to said optical cladding having at its outer edge a refractive index $n_{Cl}$, with $n_2$ and $n_{Cl}$ at the operating wavelength $\lambda$, and a volume $V_2 = \frac{1}{2}(R_2^2 - R_1^2) \times Dn_2$, and said trench satisfies the criteria:

$$-2.20 < Dn_2 < 0.0$$

and $$220 \times \text{Ln}(N) - 1100 < V_2 < 220 \times \text{Ln}(N) - 865.$$

The present invention thus relies on a novel and inventive approach of multimode optical fibers. Actually, it proposes a multimode optical fiber adapted to high-speed applications using VCSEL emitting light above 950 nm (preferably between 950 and 1310 nm), with an optimized core-cladding geometry according to the number of mode groups supported by the MMF at the operating wavelength.

Indeed, a multimode optical fiber according to embodiments of the invention is adapted to an operating wavelength equal to or larger than 950 nm, and is designed by optimizing the core-cladding geometry according to the criterion $$N = \left(\frac{R_1}{\lambda}\right)^2 (n_1^2 - n_0^2),$$

which is proportional to the number of modes supported by the MMF. With a small trench directly adjacent to the core of index difference $Dn_2$ and of volume $V_2$ satisfying $-2.20 < Dn_2 < 0.0$ and $220 \times \text{Ln}(N) - 1100 < V_2 < 220 \times \text{Ln}(N) - 865$, embodiments of the invention allow easily designing MMFs with large OFL-bandwidth at a wavelength greater than 950 nm.

According to another aspect of the present invention, said central core has a numerical aperture $NA = \sqrt{(n_1^2 - n_0^2)}$ between 0.185 and 0.215 at 633 nm.

According to an aspect of the present invention, said core outer radius $R_1$ is between 15 and 40 μm.

According to another aspect of the present invention, said operating wavelength is between 950 nm and 1310 nm.

According to another aspect of the present invention, said operating wavelength is preferentially around 1060 nm.

According to yet another aspect, for at least one wavelength comprised between 950 nm and 1310 nm, said multimode optical fiber has an overfilled launch bandwidth (OFL-BW) greater than 10000 MHz·km.

The present invention furthermore relates to a multimode optical system comprising at least a portion of a multimode optical fiber as described above. Such a multimode optical system comprises a transmitter, a receiver and a multimode optical fiber as described above. Such a system is preferably a multichannel optical communication system, whilst the present invention also relates to a single-channel optical communication system.

4. BRIEF DESCRIPTION OF THE DRAWINGS

The invention can be better understood with reference to the following description and drawings, given by way of example and not limiting the scope of protection, and in which.

The components in the figures are not necessarily to scale, emphasis instead being placed upon illustrating the principles of the invention.

5. DETAILED DESCRIPTION

Throughout this document, the terms operating wavelength designate the wavelength delivered by the light source of the VCSEL used (VCSELs with light transmitted at 25 Gb/s or higher at one or more wavelength(s) between 950 and 1310 nm).

Moreover, it is recalled that the Overfilled Launch Bandwidth OFL-BW is the originally standardized fiber bandwidth measurement method where the source launches light uniformly into all modes of the multimode fiber. By launching in all the mode groups uniformly, this measurement is sensitive to the core/cladding interface of the fiber and allows differentiating optimized core/cladding interface from non-optimized ones.

The multimode fiber according to an embodiment of the invention comprises a central core surrounded by an outer optical cladding. The central core has (i) an outer radius $R_1$, (ii) a maximum refractive index $n_1$, (iii) a minimum refractive index $n_0$, and (iv) a graded-index profile $n(r)$ that is a function of the radial distance r from the center of said central core. The minimum refractive index $n_0$ of the central core also generally corresponds to the index of the cladding (most frequently in silica).

The core and the cladding form the glass portion of the optical fiber. In some embodiments, the cladding is coated with one or more coatings, for example with an acrylate polymer.

Figure 1:
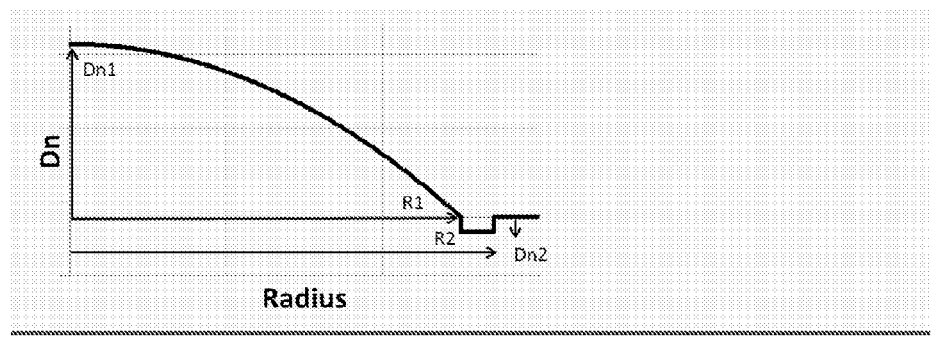
FIG. 1 shows a refractive index profile for an example of an optical fiber according to an embodiment of the invention.

FIG. 1 shows a refractive index profile shape of a multimode fiber according to an embodiment of the invention, expressed as the refractive index difference Dn as a function of the radius. As may be observed, the center core of outer radius $R_1$ shows a graded-index profile $n(r)$ is defined by the following equation:

$$n(r) = n_1 \sqrt{1 - 2\Delta\left(\frac{r}{R_1}\right)^\alpha}$$

where $$\Delta = \frac{(n_1^2 - n_0^2)}{2n_1^2}$$

and α is between 1.96 and 2.05.

The core is surrounded by an optical cladding, which comprises an inner layer of depressed refractive index directly surrounding the core. Such a trench is of inner radius $R_1$ and outer radius $R_2$, and shows a refractive index difference $Dn_2$.

Embodiments of the invention allow designing MMFs operating at longer wavelength than 850 nm, preferentially between 950 and 1310 nm, and preferentially around 1060 nm. In order to optimize the bandwidth of the MMF, the volume $V_{trench}$ (also called $V_2$ in the present document) and the refractive index difference $Dn_2$ of the trench located at the corecladding interface are designed according to a criterion N=

$$\left(\frac{R_1}{\lambda}\right)^2 (n_1^2 - n_0^2)$$

proportional to the number of modes guided by the MMF at the operating wavelength λ.

The volume of the trench $V_{trench}$ may be expressed as $V_2 = \pi(R_2^2 - R_1^2) \times Dn_2$ (in $10^{-3}$ μm$^2$), with $Dn_2 = (n_2 - n_{Cl}) \times 1000$ (in $10^{-3}$) and $n_2$ the minimum refractive index of the trench at the operating wavelength.

For alpha between 1.96 and 2.05, $R_1$ between 15 and 40 μm, NA=$\sqrt{(n_1^2 - n_0^2)}$ between 0.185 and 0.215 at 633 nm and λ≥950 nm, $Dn_2$ must satisfy: $-2.2 < Dn_2 < 0.0$ and $V_{trench}$ must satisfy: $220 \times Ln(N) - 1100 < V_{trench} < 220 \times Ln(N) - 865$ to have fibers with OFL-BW>10000 MHz·km.

Table 1 below discloses some examples (Ex. 1 to Ex. 17) of multimode optical fibers according to embodiments of the invention, showing a profile shape according to FIG. 1.

Examples Ex.1, Ex.2 and Ex.3 of Table 1 describe three MMFs optimized to have a maximum bandwidth around an operating wavelength λ=1060 nm with core radius of $R_1$=23 μm and a numerical aperture NA varying from 0.185 (example Ex. 2) to 0.205 (example Ex. 3). Criterion N, which is proportional to the number of modes supported by the MMF, is varying from 16 (example Ex. 2) to 19 (example Ex. 3). The trench index difference ($Dn_2$) and the trench volume $V_{trench}$ have been chosen to limit the effect of the cladding (i.e. to limit the increase of the group velocity of the last mode groups) to get an OFL-BW larger than 10000 MHz·km. The overfilled launch bandwidth OFL-BW thus reaches 19489 MHz·km for the MMF of example Ex. 1, 16251 MHz·km for example Ex. 2 and 10249 MHz·km for example Ex. 3.

Examples Ex.4 to Ex.17 of Table 1 disclose other examples of multimode fibers according to embodiments of the invention with core radii $R_1$ ranging from 15 to 38 μm, numerical aperture NA ranging from 0.185 to 0.215 and operating wavelength λ ranging from 950 nm (example Ex. 6) to 1310 nm (example Ex. 7). It may be noticed that the smaller the criterion N is, the more sensitive to variations of N the trench volume at the core/cladding interface is.

When the core radius $R_1$ is strongly reduced to 15 μm (see examples Ex. 16 and Ex. 17), the number of modes supported by the fiber is reduced, especially when the operating wavelength is shifted to 950 nm and higher. In such conditions, the criterion N is below 10 and the impact of core/cladding geometry on the total bandwidth is increased. Ex.16 & Ex.17 depict some MMFs with core radii equal to 15 μm, with $V_{trench}$=-435×10$^{-3}$ μm$^2$ and $V_{trench}$=-606×10$^{-3}$ μm$^2$ respectively but exhibiting an OFL-BW larger than 10000 MHz·km. Actually the multimode optical fiber of example Ex. 16 shows an overfilled launch bandwidth OFL-BW=11568 MHz·km, and the multimode optical fiber of example Ex. 17 shows an overfilled launch bandwidth OFL-BW=12723 MHz·km.

Table 2 below presents some comparative examples, which, on the contrary to the examples in Table 1 above, are all out of the scope of the present invention.

TABLE 1

| Exemple | operating wavelength (μm) | Alpha | NA (@633 nm) | R1 (μm) | R2 (μm) | Dn2 (10−3) | Vtrench (10$^{-3}$ μm$^2$) | n1 | nref | N | OFL-BW (MHz · km) |
|---|---|---|---|---|---|---|---|---|---|---|---|
| Ex. 1 | 1060 | 2.02 | 0.193 | 23 | 25.35 | −0.84 | −300 | 1.4623 | 1.4499 | 17 | 19489 |
| Ex. 2 | 1060 | 2.02 | 0.185 | 23 | 25.50 | −1.03 | −391 | 1.4613 | 1.4499 | 16 | 16251 |
| Ex. 3 | 1060 | 2.02 | 0.205 | 23 | 25.00 | −1.00 | −295 | 1.4638 | 1.4499 | 19 | 10249 |
| Ex. 4 | 1060 | 2.02 | 0.193 | 25 | 27.40 | −0.71 | −281 | 1.4623 | 1.4499 | 20 | 18150 |
| Ex. 5 | 1060 | 2.02 | 0.185 | 25 | 27.11 | −0.98 | −339 | 1.4613 | 1.4499 | 18 | 18423 |
| Ex. 6 | 950 | 2.04 | 0.193 | 25 | 26.92 | −0.71 | −223 | 1.4637 | 1.4513 | 25 | 18495 |
| Ex. 7 | 1310 | 1.98 | 0.193 | 25 | 28.38 | −0.88 | −500 | 1.4594 | 1.4471 | 13 | 12991 |
| Ex. 8 | 1060 | 2.02 | 0.205 | 27 | 29.50 | −0.76 | −337 | 1.4638 | 1.4499 | 26 | 10993 |
| Ex. 9 | 1060 | 2.02 | 0.193 | 27 | 28.64 | −0.74 | −211 | 1.4623 | 1.4499 | 23 | 17388 |
| Ex. 10 | 1060 | 2.02 | 0.185 | 27 | 29.11 | −0.85 | −316 | 1.4613 | 1.4499 | 21 | 18389 |
| Ex. 11 | 1060 | 2.02 | 0.2 | 32 | 34.50 | −0.53 | −275 | 1.4632 | 1.4499 | 35 | 11847 |
| Ex. 12 | 1060 | 2.02 | 0.185 | 32 | 33.09 | −0.86 | −193 | 1.4613 | 1.4499 | 30 | 19929 |
| Ex. 13 | 1060 | 2.02 | 0.185 | 35 | 35.66 | −1.08 | −158 | 1.4613 | 1.4499 | 36 | 17697 |
| Ex. 14 | 1060 | 2.02 | 0.2 | 38 | 40.32 | −0.19 | −107 | 1.4632 | 1.4499 | 50 | 12374 |
| Ex. 15 | 1060 | 2.02 | 0.185 | 38 | 40.49 | −0.15 | −93 | 1.4613 | 1.4499 | 42 | 22264 |
| Ex. 16 | 1060 | 2.02 | 0.215 | 15 | 17.96 | −1.42 | −435 | 1.4652 | 1.4499 | 9 | 11568 |
| Ex. 17 | 1060 | 2.02 | 0.185 | 15 | 19.00 | −1.42 | −606 | 1.4613 | 1.4499 | 7 | 12723 |

TABLE 2

| Exemple | operating wavelength (µm) | Alpha | NA (@633 nm) | R1 (µm) | R2 (µm) | Dn2 (10⁻³) | Vtrench (10⁻³ µm²) | n1 | nref | N | OFL-BW (MHz·km) |
|---|---|---|---|---|---|---|---|---|---|---|---|
| Ex. 1c | 1060 | 2.02 | 0.205 | 23 | 23.75 | −0.98 | −108 | 1.4638 | 1.4499 | 19 | 7863 |
| Ex. 2c | 1060 | 2.02 | 0.205 | 23 | 24.00 | −2.94 | −434 | 1.4638 | 1.4499 | 19 | 2325 |
| Ex. 3c | 1060 | 2.02 | 0.205 | 23 | 24.75 | −2.94 | −772 | 1.4638 | 1.4499 | 19 | 1786 |
| Ex. 4c | 1060 | 2.02 | 0.205 | 25 | 26.90 | −1.47 | −455 | 1.4638 | 1.4499 | 23 | 5416 |
| Ex. 5c | 1060 | 2.02 | 0.215 | 32 | 33.30 | −1.47 | −392 | 1.4652 | 1.4499 | 41 | 5187 |
| Ex. 6c | 1060 | 2.02 | 0.215 | 32 | 32.80 | 0.49 | 80 | 1.4652 | 1.4499 | 41 | 6548 |
| Ex. 7c | 1060 | 2.02 | 0.212 | 15 | 18.90 | −1.96 | −814 | 1.4648 | 1.4499 | 9 | 3227 |
| Ex. 8c | 1060 | 2.02 | 0.212 | 15 | 16.50 | −2.45 | −364 | 1.4648 | 1.4499 | 9 | 3511 |
| Ex. 9c | 1060 | 2.02 | 0.185 | 15 | 19.50 | −1.47 | −717 | 1.4613 | 1.4499 | 7 | 7692 |

Figure 2:
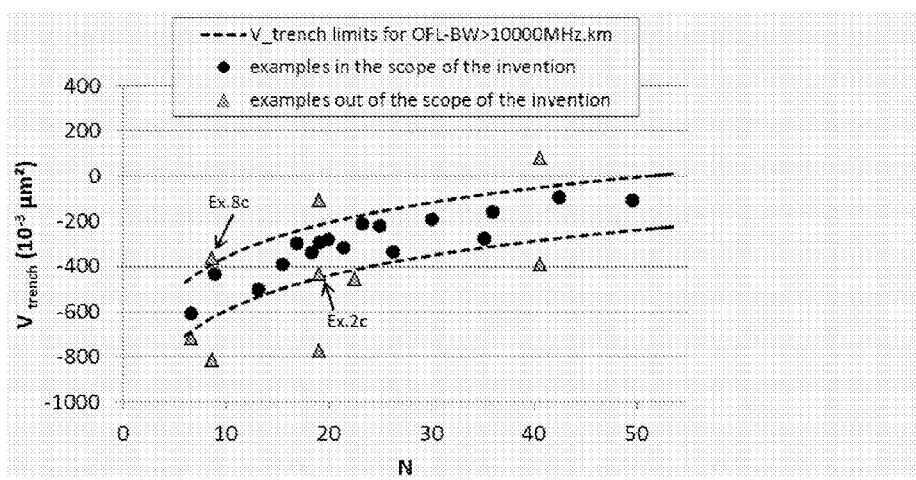
FIG. 2 shows the range of the volume of the trench $V_{trench}$ for an optical fiber according to embodiments of the invention, as a function of N, to get an OFL-BW over 10000 MHz·km.

FIG. 2 represents the range of the volume of the trench $V_{trench}$ for an optical fiber according to embodiments of the invention, expressed in $10^{-3}$ µm², as a function of criterion N, to get an OFL-BW over 10000 MHz·km. The dashed lines show the lower and upper limits of the volume of the trench $V_{trench}$ as a function of N, for multimode optical fibers with alpha between 1.96 and 2.05, core radius $R_1$ between 15 and 40 µm and numerical aperture NA between 0.185 and 0.215, whatever the operating wavelength λ≥950 nm.

Moreover, the examples Ex. 1 to Ex. 17 of multimode optical fibers listed in Table 1 have been added in the form of black dots on FIG. 2. As may be observed, all the corresponding black dots are comprised between the lower and upper limits of $V_{trench}$, as all the examples of Table 1 fulfill the criterion: $220 \times Ln(N) - 1100 < V_{trench} < 220 \times Ln(N) - 865$.

Comparative examples Ex. 1c to Ex. 9c of Table 2 have also been plotted on FIG. 2, as triangles. Most triangles fall out of the range of allowable volumes $V_{trench}$, except for comparative examples Ex. 2c and Ex. 8c. However, multi-mode optical fibers of comparative examples Ex. 2c and Ex. 8c are also out of the scope of embodiments of the invention, as they exhibit a refractive index difference of the trench $Dn_2 < -2.2 \times 10^{-3}$.

As may be observed in Table 2, comparative examples Ex.1c, Ex.2c and Ex.3c exhibit the same numerical aperture NA=0.205, the same alpha α=2.02 and the same core radius $R_1$=23 µm (and thus the same value of criterion N=19) as example Ex.3 of Table 1. However, the three multimode optical fibers of examples Ex.1c, Ex.2c and Ex.3c all have lower bandwidth performances than example Ex. 3.

It is recalled that low order mode groups travel near the center of the core, while higher order mode groups travel closer to the core-cladding interface. In order to reduce the modal dispersion DMD, and thus increase the bandwidth of the optical fiber, the difference in time delays of the mode groups travelling through the fiber must be as small as possible. Carefully designing the volume of the trench, according to embodiments of the invention, allows modifying the time delays of the mode groups near the core-cladding interface.

Figure 3:
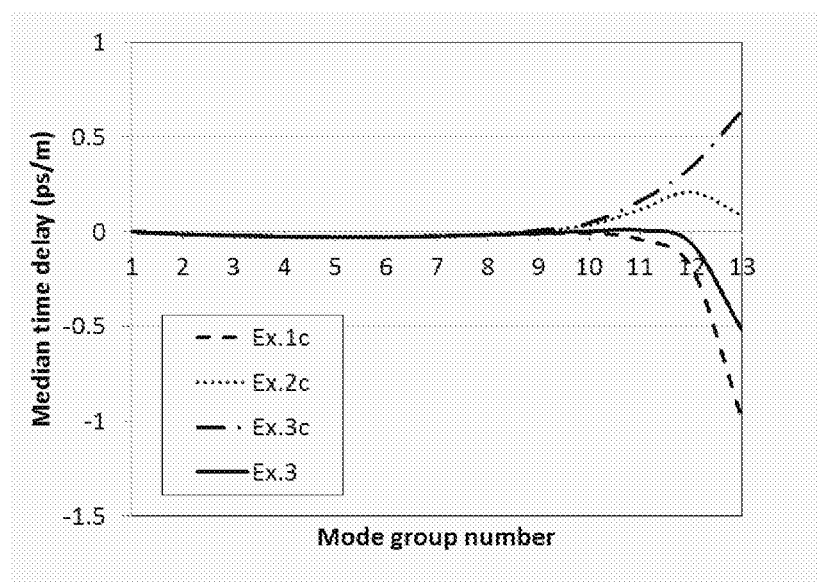
FIG. 3 illustrates the median value of the time delay per mode group for several MMF, one of which complies with the requirements of the invention, while the others don't.

Trench dimensions of example Ex. 3 (i.e. trench volume and trench index) have been chosen to minimize the effect of the core/cladding interface. As may be observed on FIG. 3, which shows the median value of the time delay (expressed in ps/m) per mode group (expressed in mode group number) for example Ex. 3 of Table 1 and comparative examples Ex. 1c, Ex. 2c and Ex. 3c of Table 2, only the last mode group of example Ex. 3 has time delay strongly reduced compared to the other mode groups.

Comparative example Ex.1c has a smaller trench volume ($V_{trench}$=108) than Ex.3 ($V_{trench}$=295) (in absolute value). Time delays of the three last (i.e. high order) mode groups (i.e. mode groups n°11, n°12 and n°13) are strongly reduced compared to the lowest order mode groups.

As a consequence of the small trench volume $V_{trench}$ of comparative example Ex. 1c, and hence of the strongly reduced time delays of the three last mode groups, the OFL-BW of the multimode optical fiber of comparative example Ex. 1c is below 10000 MHz·km.

Comparative example Ex.2c has a trench volume ($V_{trench}$=−434 (in $10^{-3}$ µm²)) sufficient to compensate for the core/cladding interface. But the trench index is too low ($Dn_2$=−2.94) and does not fulfill the criterion set out in embodiments of the invention (−2.2<$Dn_2$<0.0). Although the time delay difference of the latest mode group (mode group n°13) is strongly reduced, compared to comparative examples Ex.3 and Ex.1c, the last four mode groups (i.e. mode groups n°10, n°11, n°12 and n°13) are all disturbed by the trench. Hence, although the difference in time delays between mode groups is not so high, the great number of mode groups influenced by the trench has a negative impact on the bandwidth, so that the overfilled launch bandwidth OFL-BW is reduced to ~2300 MHz·km.

In comparative example Ex.3c, both trench volume and trench depth are too large. Actually, as may be read in Table 2, $V_{trench}$=−772 (in $10^{-3}$ µm²)) and $Dn_2$=−2.94 (in $10^{-3}$). As a consequence, the last four mode groups (i.e. mode groups n°10, n°11, n°12 and n°13) are too much disturbed by the trench and the OFL-BW is further reduced to ~1700 MHz·km.

Comparative examples Ex.4c, Ex.5c and Ex.6c depict some MMFs with core radii equal to 25 µm (Ex. 4c) and 32 µm (Ex. 5c and Ex.6c). As regards comparative examples Ex.4c and Ex.5c, the trench volume is too large according to criterion N: the corresponding triangles plotted on FIG. 2 are below the lower limit set out for $V_{trench}$. As regards comparative example Ex. 6c, the trench volume is too small according to criterion N: the corresponding triangle plotted on FIG. 2 is above the upper limit set out for $V_{trench}$.

Comparative examples Ex.7c, Ex.8c & Ex.9c depict some MMFs with core radii equal to 15 µm too. As regards comparative examples Ex.7c and Ex.9c, the trench volume is too large according to criterion N: the corresponding triangles plotted on FIG. 2 are below the lower limit set out for $V_{trench}$. As regards comparative example Ex. 8c, although the trench volume satisfies the criterion $220 \times Ln(N) - 1100 < V_{trench} < 220 \times Ln(N) - 865$, the refractive index difference Dn2 of the trench is too low ($Dn_2$=−2.45 (in $10^{-3}$)).

The criteria set out in embodiments of the invention allow increasing the OFL-bandwidth of a multimode fiber to above 10000 MHz·km at an operating wavelength between 950 nm and 1310 nm. The relationship $220 \times Ln(N) - 1100 < V_{trench} < 220 \times Ln(N) - 865$ linking the minimum and maximum acceptable values for the volume of the trench $V_{trench}$ with the parameter N allows to easily design the optimum trench volume, and define the optimum core/cladding geometry, whatever the core size and the operating wavelength.

The invention claimed is:

1. A multimode optical fiber, comprising a central core surrounded by an outer optical cladding, said central core having (i) an outer radius $R_1$, (ii) a maximum refractive index $n_1$, (iii) a minimum refractive index $n_0$, and (iv) a graded-index profile n(r) that is a function of the radial distance r from the center of said central core, said central core's graded-index profile n(r) is defined by the following equation:

$$n(r) = n_1\sqrt{1 - 2\Delta\left(\frac{r}{R_1}\right)^\alpha}$$

where:

$$\Delta = \frac{(n_1^2 - n_0^2)}{2n_1^2}$$

and α is between 1.96 and 2.05, with α a non-dimensional parameter that is indicative of the shape of the index profile, with $n_0$ and $n_1$ at an operating wavelength λ, said central core has an N value between 7 and 52, where N is defined by the following equation:

$$N = \left(\frac{R_1}{\lambda}\right)^2 (n_1^2 - n_0^2),$$

with λ the operating wavelength such that λ≥950 nm,
wherein said optical cladding comprises a trench, a region of depressed refractive index $n_2$, surrounding said central core, said trench having an inner radius $R_1$, an outer radius $R_2$, with $R_2 > R_1$, a refractive index difference $Dn_2 = (n_2 - n_{Cl}) \times 1000$ with respect to said optical cladding having at its outer edge a refractive index $n_{Cl}$, with $n_2$ and $n_{Cl}$ at the operating wavelength λ, and a volume $V_2 = \pi(R_2^2 - R_1^2) \times Dn_2$, where $Dn_2$ is expressed in $10^{-3}$ and $V_{trench}$ is expressed in $10^{-3}$ µm²,
and wherein said trench satisfies the criteria:

$-2.20 < Dn_2 < 0.0$ and $220 \times Ln(N) - 1100 < V_2 < 220 \times Ln(N) - 865.$ 2. The multimode optical fiber according to claim 1, wherein said central core has a numerical aperture NA=$\sqrt{(n_1^2 - n_0^2)}$ between 0.185 and 0.215 at 633 nm.

3. The multimode optical fiber according to claim 1, wherein said core outer radius $R_1$ is between 15 and 40 µm.

4. The multimode optical fiber according to claim 1, wherein said operating wavelength λ is between 950 nm and 1310 nm.

5. The multimode optical fiber according to claim 4, wherein said operating wavelength λ is around 1060 nm.

6. The multimode optical fiber according to claim 1, wherein, for at least one operating wavelength between 950 nm and 1310 nm, said multimode optical fiber has an overfilled launch bandwidth (OFL-BW) greater than 10000 MHz·km.

7. A multimode optical system comprising at least a portion of a multimode optical fiber according to claim 1.

8. The multimode optical fiber according to claim 1, wherein said central core has an N value between 7 and 13.

9. The multimode optical fiber according to claim 1, wherein said central core has an N value between 13 and 26.

10. The multimode optical fiber according to claim 1, wherein said central core has an N value between 26 and 52.

11. The multimode optical fiber according to claim 1, wherein said core outer radius $R_1$ is between 15 and 27 µm.

12. The multimode optical fiber according to claim 1, wherein said core outer radius $R_1$ is between 23 and 40 µm.

13. The multimode optical fiber according to claim 1, wherein said core outer radius $R_1$ is between 23 and 27 µm.

14. The multimode optical fiber according to claim 1, wherein, at an operating wavelength of 1060 nm, said multimode optical fiber has an overfilled launch bandwidth (OFL-BW) greater than 10000 MHz·km.

15. A multimode optical fiber, comprising a central core surrounded by an outer optical cladding, said central core having (i) an outer radius $R_1$ between 23 and 27 µm, (ii) a maximum refractive index $n_1$, (iii) a minimum refractive index $n_0$, and (iv) a graded-index profile n(r) that is a function of the radial distance r from the center of said central core, said central core's graded-index profile n(r) is defined by the following equation:

$$n(r) = n_1\sqrt{1 - 2\Delta\left(\frac{r}{R_1}\right)^\alpha}$$

where:

$$\Delta = \frac{(n_1^2 - n_0^2)}{2n_1^2}$$

and α is between 1.96 and 2.05, with α a non-dimensional parameter that is indicative of the shape of the index profile,
said central core has an N value between 13 and 26, where N is defined by the following equation:

$$N = \left(\frac{R_1}{\lambda}\right)^2 (n_1^2 - n_0^2),$$

with λ the operating wavelength between 950 nm and 1310 nm,
wherein said optical cladding comprises a trench, a region of depressed refractive index $n_2$, surrounding said central core, said trench having an inner radius $R_1$, an outer radius $R_2$, with $R_2 > R_1$, a refractive index difference $Dn_2 = (n_2 - n_{Cl}) \times 1000$ with respect to said optical cladding having at its outer edge a refractive index $n_{Cl}$, with $n_2$ and $n_{Cl}$ at the operating wavelength λ, and a volume $V_2 = \pi(R_2^2 - R_1^2) \times Dn_2$, where $Dn_2$ is expressed in $10^{-3}$ and $V_{trench}$ is expressed in $10^{-3}$ µm²,
wherein said trench satisfies the criteria:

$-2.20 < Dn_2 < 0.0$ and $220 \times Ln(N) - 1100 < V_2 < 220 \times Ln(N) - 865,$ and wherein, for at least one operating wavelength between 950 nm and 1310 nm, said multimode optical fiber has an overfilled launch bandwidth (OFL-BW) greater than 10000 MHz·km.

16. The multimode optical fiber according to claim 15, wherein said central core has a numerical aperture NA= $\sqrt{(n_1^2 - n_0^2)}$ between 0.185 and 0.215 at 633 nm.

17. The multimode optical fiber according to claim 15, wherein, at an operating wavelength of 1060 nm, said multimode optical fiber has an overfilled launch bandwidth (OFL-BW) greater than 10000 MHz·km.

* * * * *

UNITED STATES PATENT AND TRADEMARK OFFICE
CERTIFICATE OF CORRECTION

PATENT NO.       : 9,921,369 B2
APPLICATION NO.  : 15/510296
DATED            : March 20, 2018
INVENTOR(S)      : Bigot et al.

Page 1 of 1

It is certified that error appears in the above-identified patent and that said Letters Patent is hereby corrected as shown below:

In the Claims

Claim 15, Column 12 delete Line 56 and insert:
-- $n_2$ and $n_{Cl}$ at the operating wavelength $\lambda$, and a volume --

Signed and Sealed this
Nineteenth Day of June, 2018

Andrei Iancu
*Director of the United States Patent and Trademark Office*